(12) United States Patent
Sohn

(10) Patent No.: US 9,874,985 B2
(45) Date of Patent: Jan. 23, 2018

(54) TOUCH WINDOW

(71) Applicant: LG INNOTEK CO., LTD., Seoul (KR)

(72) Inventor: Dong Woo Sohn, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 12 days.

(21) Appl. No.: 14/878,618

(22) Filed: Oct. 8, 2015

(65) Prior Publication Data

US 2016/0103526 A1 Apr. 14, 2016

(30) Foreign Application Priority Data

Oct. 8, 2014 (KR) ........................ 10-2014-0135888

(51) Int. Cl.
*G06F 3/044* (2006.01)

(52) U.S. Cl.
CPC .... *G06F 3/044* (2013.01); *G06F 2203/04102* (2013.01); *G06F 2203/04103* (2013.01); *G06F 2203/04111* (2013.01); *G06F 2203/04112* (2013.01)

(58) Field of Classification Search
CPC .......... G06F 3/044; G06F 2203/04102; G06F 2203/04103; G06F 2203/04111; G06F 2203/04112
USPC ........................................................ 345/174
See application file for complete search history.

(56) References Cited

U.S. PATENT DOCUMENTS

| | | | | |
|---|---|---|---|---|
| 8,830,180 | B2 * | 9/2014 | Yilmaz | G01D 5/2405 345/173 |
| 2009/0213090 | A1 * | 8/2009 | Mamba | G06F 3/044 345/174 |
| 2009/0219258 | A1 * | 9/2009 | Geaghan | G06F 3/044 345/173 |
| 2010/0156840 | A1 * | 6/2010 | Frey | G06F 3/044 345/174 |
| 2011/0291966 | A1 * | 12/2011 | Takao | G06F 3/044 345/173 |
| 2012/0031746 | A1 * | 2/2012 | Hwang | G06F 3/041 200/5 A |
| 2012/0169626 | A1 * | 7/2012 | Hsieh | G06F 3/044 345/173 |
| 2013/0141369 | A1 * | 6/2013 | Huang | G06F 3/041 345/173 |
| 2014/0041924 | A1 * | 2/2014 | Cok | G06F 3/044 174/268 |
| 2014/0174788 | A1 * | 6/2014 | Lin | G06F 3/044 174/126.1 |
| 2015/0220181 | A1 * | 8/2015 | Jung | G06F 3/044 345/174 |
| 2015/0227239 | A1 * | 8/2015 | Kim | G06F 3/044 345/174 |

FOREIGN PATENT DOCUMENTS

| | | |
|---|---|---|
| JP | 2011-175628 A | 9/2011 |
| KR | 10-2013-0006296 A | 1/2013 |
| KR | 10-2013-0009711 A | 1/2013 |

* cited by examiner

*Primary Examiner* — Benyam Ketema
(74) *Attorney, Agent, or Firm* — KED & Associates, LLP

(57) ABSTRACT

A touch window includes a substrate including an active area and an unactive area. A sensing electrode is disposed on the active area and includes a sensing electrode pattern of meshed lines, wherein linearity of the sensing electrode pattern is in a range of ±40 μm to ±100 μm.

20 Claims, 18 Drawing Sheets

TOUCH WINDOW

CROSS-REFERENCE TO RELATED APPLICATIONS

This application claims priority under 35 U.S.C. §119 to Korean Application No. 10-2014-0135888 filed on Oct. 8, 2014, whose entire disclosure is incorporated herein by reference.

BACKGROUND

1. Field

The embodiment relates to a touch window.

2. Background

Recently, a touch window, which performs an input function through the touch of an image displayed on a display device by an input device such as a stylus pen or a hand, has been applied to various electronic appliances. Indium tin oxide (ITO), which is the most widely used material for the transparent electrode of the touch window, is expensive and is easy to be physically damaged when the substrate is flexed and bent, so that the electrode property is deteriorated. Therefore, the indium tin oxide (ITO) is not suitable for a flexible device. Further, when the ITO is applied to a touch panel having a large size, a problem occurs due to high resistance.

In order to solve the problem, researches and studies on an alternative electrode have been actively performed. For example, the study for substituting an electrode material for ITO by forming the electrode material in a mesh shape has been performed. Although such a mesh-shaped electrode may relieve the resistance problem of a large-sized touch window, since a metal is used instead of the transparent material, an electrode pattern may be viewed from an outside. Therefore, there is a need to provide a touch window having a new structure which may solve the above-mentioned problems.

BRIEF DESCRIPTION OF THE DRAWINGS

The embodiments will be described in detail with reference to the following drawings in which like reference numerals refer to like elements wherein.

DETAILED DESCRIPTION

Figure 1:
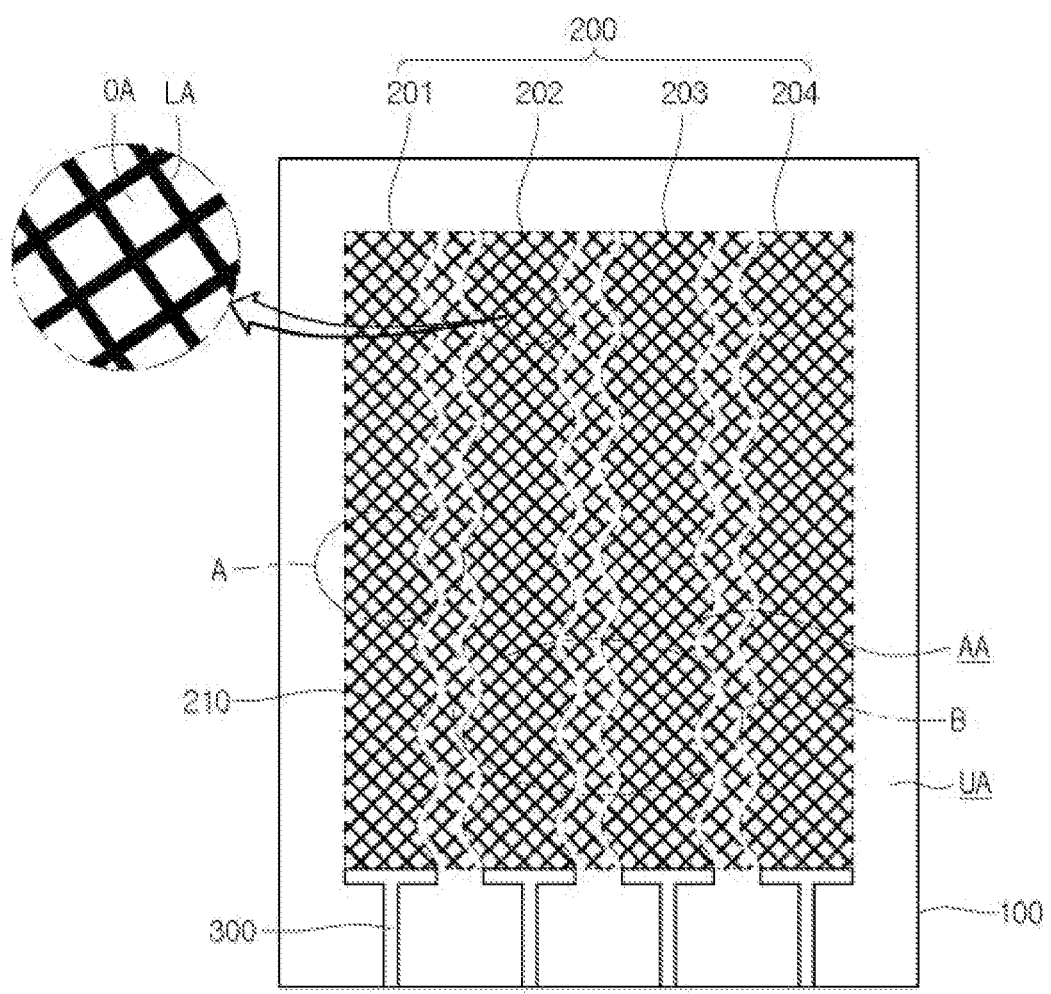
FIG. 1 is a top view showing a touch window according to a first embodiment.
Figure 2:
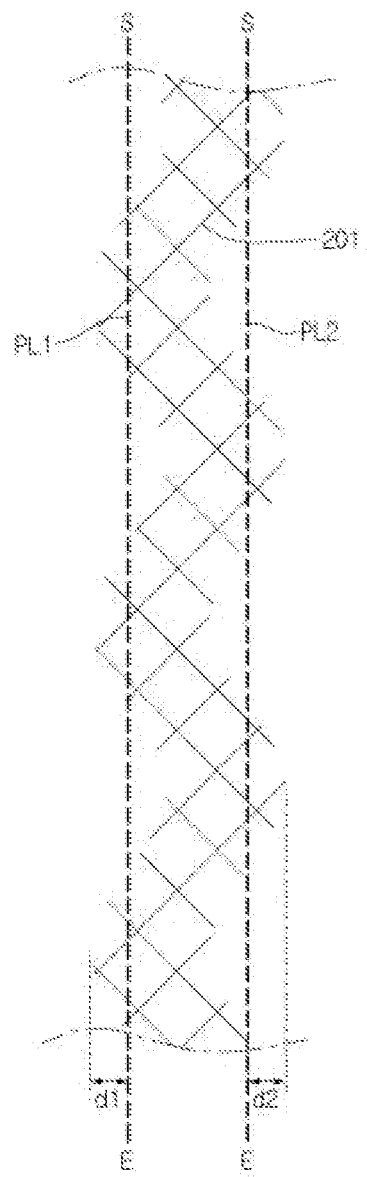
FIG. 2 is an enlarged view of area A of FIG. 1.
Figure 3:
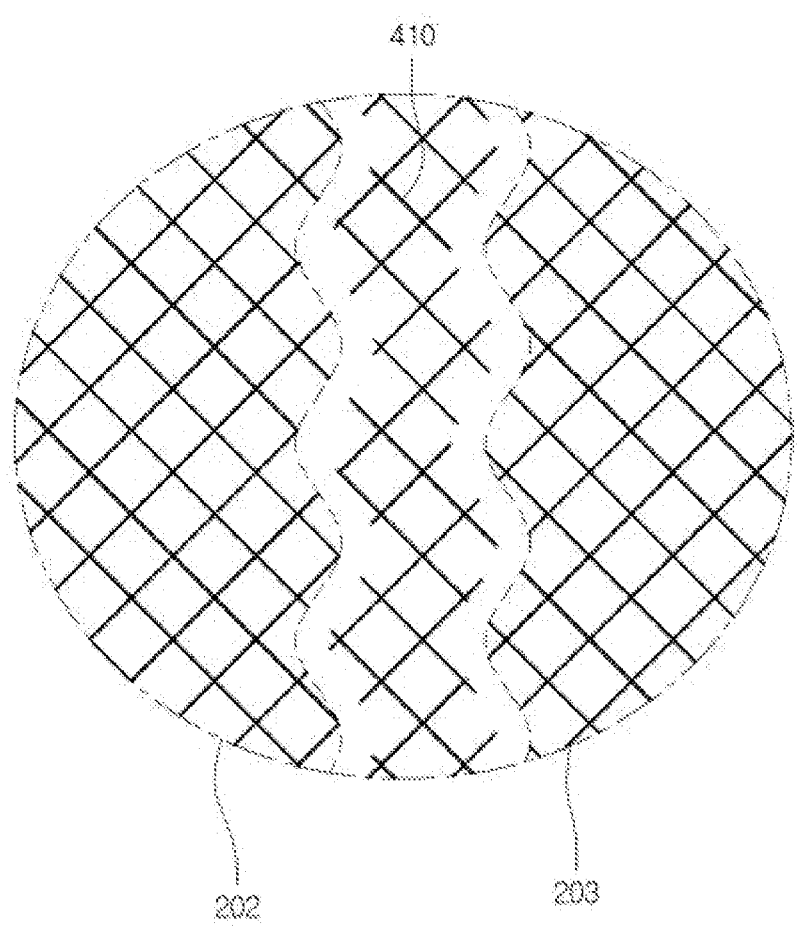
FIG. 3 is an enlarged view of area B of FIG. 1.
Figure 4:
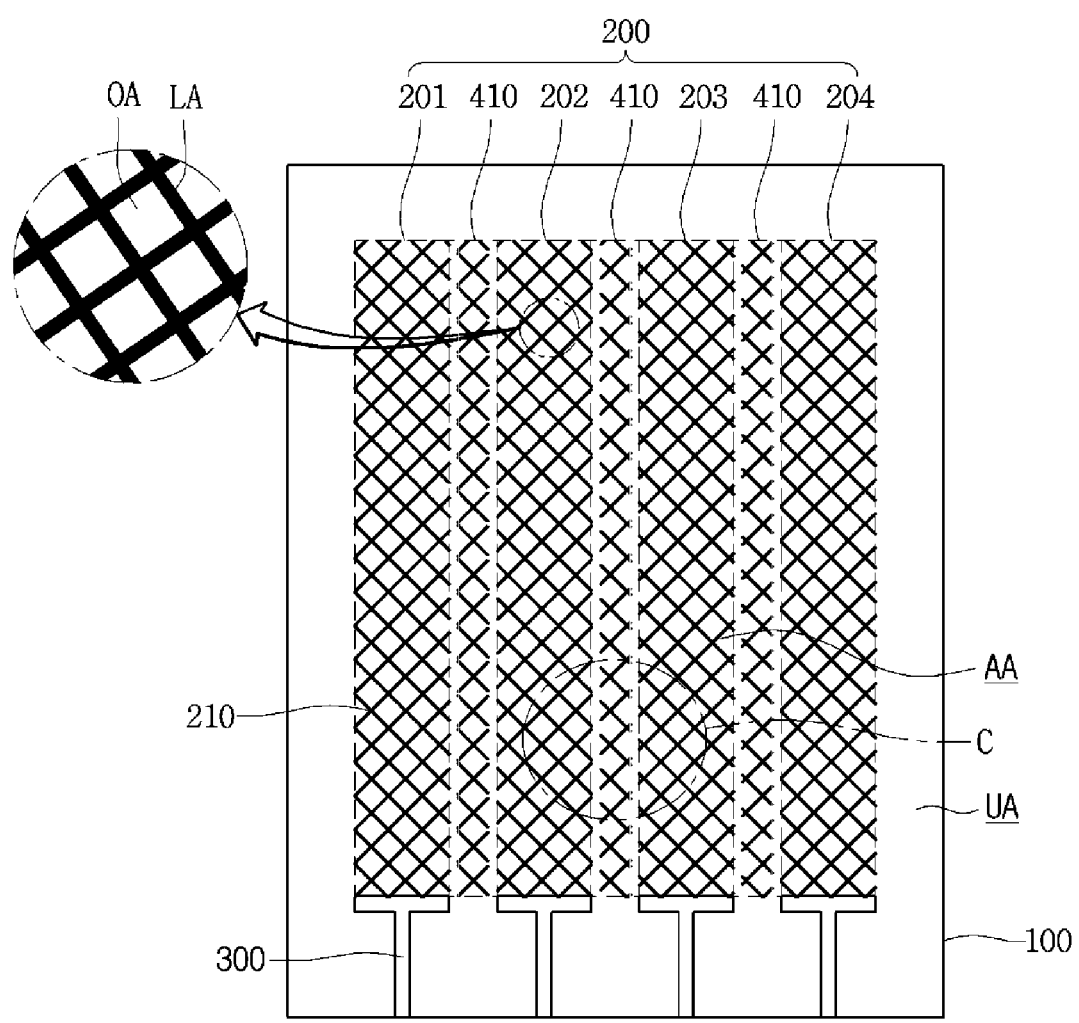
FIG. 4 is a top view showing a touch window according to a second embodiment.

Referring to FIGS. 1 to 3, a touch window according to the first embodiment may include a substrate 100, a sensing electrode pattern 200 and a wire electrode pattern 300. The substrate 100 may support the sensing electrode pattern 200 and the wire electrode pattern 300, i.e., the substrate 100 may be a support substrate. The substrate 100 may be bent to have a partial curved surface. The substrate 100 may be bent to have a partial flat surface and a partial curved surface. An end of the substrate 100 may be bent to have a curved surface or may be bent or flexed to have a surface including a random curvature. The substrate 100 may be a cover substrate. The cover substrate may be further disposed on the substrate 100.

The substrate 100 may be flexible or rigid. For example, the substrate 100 may include glass or plastic. The substrate 100 may include chemically tempered glass such as soda lime glass or aluminosilicate glass, or reinforced/flexible plastic such as polyimide (PI), polyethylene terephthalate (PET), propylene glycol (PPG) or poly carbonate (PC), or sapphire. Sapphire has superior electric characteristics, such as permittivity, so that a touch response speed may be greatly increased and a space touch such as hovering may be easily implemented. In addition, since sapphire has high surface hardness, the sapphire is applicable to a cover substrate. The hovering refers to a technique of recognizing coordinates even at a slight distance from a display.

The substrate 100 may also include an optically isotropic film. For example, the substrate 100 may include cyclic olefin copolymer (COO), cyclic olefin polymer (COP), optically isotropic polycarbonate (PC), or optically isotropic polymethyl methacrylate (PMMA).

The substrate 100 may have an active area AA and an unactive area UA defined therein. An image may be displayed in the active area AA. The image is not displayed in the unactive area UA provided at a peripheral portion of the active area AA.

In addition, the position of an input device or a finger may be sensed in at least one of the active area AA and the unactive area UA. If the input device or a finger touches the touch window, the variation of capacitance occurs in the touched part by the input device, and the touched part subject to the variation of the capacitance may be detected as a touch point.

The sensing electrode pattern 200 may be disposed on the active area AA of the substrate 100. The sensing electrode pattern 200 may be formed by patterning the sensing electrode 210 disposed on the active area AA of the substrate in a predetermined shape. For example, as shown in FIG. 1, the sensing electrode pattern 200 may be entirely formed in a bar shape by patterning the sensing electrode 210. Although the sensing electrode pattern 200 extending on the substrate 100 in one direction is depicted in FIG. 1, the embodiment is not limited thereto and the sensing electrode pattern 200 may extend in another direction crossing the one direction, or in various directions such as one direction and the opposite direction, that is, both directions.

The sensing electrode 210 may include a transparent conductive material that allows electricity to flow therethrough without interrupting transmission of light. For example, the sensing electrode 210 may include metal oxide such as indium tin oxide (ITO), indium zinc oxide (IZO), copper oxide, tin oxide, zinc oxide, or titanium oxide. In addition, the sensing electrode 210 may include a nano wire, a photo sensitive nanowire film, a carbon nanotube (CNT), graphene, or conductive polymer.

The sensing electrode 210 may include various metals. For example, the sensing electrode 200 may include at least one of Cr, Ni, Cu, Al, Ag, Mo, Au, Ti and the alloy thereof.

The sensing electrode 210 may be disposed in a mesh shape. The sensing electrode 210 may include mesh lines crossing each other and the entire shape of the sensing electrode 210 may be a mesh shape by the mesh lines. Mesh lines may be defined as an electrode structure constituting a single sensing electrode unit. The sensing electrode pattern may be formed in a desired pattern such as a bar pattern shown in FIG. 1, or a polygonal pattern including a diamond pattern. The plurality of mesh lines may be disposed in a single sensing electrode pattern while crossing each other.

Since a mesh shape signifies a shape formed by crossing the mesh lines, the mesh shape may signifies a net shape. A closing part in which the mesh lines cross each other and an opening part in which one surface of the substrate is exposed by the mesh lines may be formed on the substrate 100.

Referring to FIG. 1, the sensing electrode 210 may include mesh lines LA formed by a plurality of sub-electrodes crossing each other in the mesh shape and a mesh opening part OA formed between the mesh lines LA by the mesh lines LA. The mesh opening part OA may have various shapes. For example, the mesh opening part OA may have various shapes such as have a polygonal shape including a rectangular shape, a diamond shape, a pentagon shape and a hexagonal shape, or a circular shape.

As the sensing electrode has a mesh shape, the pattern of the sensing electrode may not be viewed in the active area AA. Even when the sensing electrode is formed of an opaque material such as a metal, the sensing electrode may be allowed not to be visable. Further, even when the sensing electrode is applied to a large-size touch window, the resistance of the touch window may be reduced.

A line width of the mesh line LA of the sensing electrode 210 may be equal to or less than about 10 μm. For example, the line width of the mesh line LA may exceed 0.1 μm and may be equal to or less than 10 μm. The line width of the mesh line LA may exceed 0.5 μm and may be equal to or less than 5 μm. The mesh line LA may have a line width in the range of about 1.5 μm to about 3 μm.

When the line width of the mesh line LA may exceed about 10 μm, the sensing electrode may be viewed so that the visibility may be deteriorated. When the line width of the mesh line LA is less than about 0.1 μm, the sensing electrode is too thin so that the sensing electrode may be cut off, thereby deteriorating the reliability.

As described above, the sensing electrode 210 may be patterned to be divided into a plurality of sensing electrode patterns 200. For example, as show FIG. 1, the sensing patterns 200 may include first to fourth sensing electrode patterns 201 to 204. The sensing electrode pattern 200 may have linearity. At least one of the first and second sensing electrode patterns 201 and 202 may have linearity. In this case, the linearity may represent a degree of parallel of the sensing electrode pattern 200.

The first and second sensing electrode patterns 201 and 202 may be spaced apart from each other. The mesh line LA disconnected from first and second sensing electrode patterns 201 and 202 may be disposed between the first and second sensing electrode patterns 201 and 202. By disconnecting the mesh line LA on the substrate in a predetermined pattern, the plurality of sensing electrode patterns such as the first and second sensing electrode patterns 201 and 202 may be formed.

FIG. 2 is an enlarged view of area A of FIG. 1. Virtual parallel lines, i.e., first and second parallel lines PL1 and PL2, may be defined. A distance of the sensing electrode pattern away from the first parallel line PL1 may be defined as a first deviation d1, and a distance of the sensing electrode pattern away from the second parallel line PL2 may be defined as a second deviation d2.

The degrees of the first and second deviations d1 and d2 may be defined as the linearity of the sensing electrode pattern. As the first and second deviations d1 and d2 are reduced, the linearity may be more improved. As the first and second deviations d1 and d2 are increased, the linearity may be more deteriorated. In this case, the virtual parallel lines may be defined as a line connecting a starting point S to an end point E of the sensing electrode pattern.

The linearity of the sensing electrode pattern 200 may be in the range of about ±40 μm to about ±100 μm. The sensing electrode pattern 200 may be away from the virtual parallel lines by a deviation in the range of about ±40 μm to about ±100 μm. The linearity of the sensing electrode pattern 200 may be in the range of about ±50 μm to about ±90 μm. The linearity of the sensing electrode pattern 200 may be in the range of about ±60 μm to about ±80 μm. Thus, the sensing electrode pattern having a bar-shaped pattern may be connected in not a straight line but a zigzag line.

When the linearity of the sensing electrode pattern 200 is less than about ±40 μm, the sensing electrode pattern may be viewed from an outside. When the linearity of the sensing electrode pattern 200 exceeds about ±100 μm, the sensing electrode patterns spaced apart from each other may make contact with each other, so that the sensing electrode patterns may be short circuited with each other.

Since the sensing electrode pattern 200 has linearity in the range described above, the sensing electrode pattern 200 may be prevented from being viewed from an outside. In case of the sensing electrode pattern formed in a straight line, i.e., a bar pattern, although the mesh line LA in the sensing electrode pattern has a narrow line width so that the mesh line LA may not be viewed from an outside, the sensing electrode pattern formed by the mesh line LA is formed by cutting the mesh line LA, so that the visibility may be deteriorated.

Since the linearity is given to the sensing electrode pattern as much as the range described above so that the sensing electrode pattern is connected in a zigzag manner not a straight line, the sensing electrode pattern may be prevented from being viewed from an outside so that the visibility of the entire touch window may be improved.

As shown in FIG. 3, which is an enlarged view of area B of FIG. 1, the touch window may further include a first dummy pattern 410. The touch window may further include the first dummy pattern 410 disposed between the sensing electrode patterns 200. The first dummy electrode pattern 410 may be disposed between the second and third sensing electrode patterns 202 and 203. The first dummy electrode patterns 410 may be spaced apart from each other and disposed between the second and third sensing electrode patterns 202 and 203 of which the mesh lines LA are cut off.

The first dummy electrode pattern 410 may be disposed between the sensing electrode patterns 200. The first dummy electrode pattern 410 may include a conductive material. For example, the first dummy electrode pattern 410 may include a material equal or similar to the sensing electrode pattern 200 described above. The first dummy electrode pattern 410 may be formed in a bar shape similarly to the sensing electrode pattern 200. The first dummy electrode pattern 410 may have a pattern corresponding to the sensing electrode pattern 200 while being disposed between the sensing electrode patterns 200.

For example, the first dummy electrode pattern 410 may have linearity equal or similar to that of the first dummy electrode pattern 410. The linearity of the first dummy electrode pattern 410 may be in the range of about ±40 μm to about ±100 μm. The first dummy electrode pattern 410 may be away from the virtual parallel line by a deviation in the range of about ±40 μm to about ±100 μm. The linearity of the first dummy electrode pattern 410 may be in the range of about ±50 μm to about ±90 μm. The linearity of the first dummy electrode pattern 410 may be in the range of about ±60 μm to about ±80 μm.

The first dummy electrode pattern 410 having a bar-shaped pattern may be connected in not a straight line but a zigzag line. When the linearity of the first dummy electrode pattern 410 is less than about ±40 μm, the first dummy electrode pattern 410 may be viewed from an outside. In addition, when the linearity of the first dummy electrode pattern 410 exceeds about ±100 μm., the sensing electrode pattern may make contact with each other, so that the sensing electrode pattern may be short circuited.

According to the touch window of an embodiment, the first dummy electrode pattern can prevent the sensing electrode patterns from being viewed from an outside. The first dummy pattern is disposed between the sensing electrode patterns spaced apart from each other, so that the spaced area looks as if electrodes are disposed therein, so it can be relieved that the sensing electrode pattern is viewed from an outside, so that the visibility of the touch window can be improved.

The wire electrode 300 may be connected to the sensing electrode pattern 200. One end of the wire electrode 300 is connected to the sensing electrode pattern 200 and the opposite end is connected to a printed circuit board, so that the touch signal sensed from the sensing electrode may transfer to a driving chip mounted on the printed circuit board. The wire electrode 300 may include a material equal or similar to that of the sensing electrode 210. The wire electrode 300 may include a mesh shape.

Hereinafter, a touch window according to a second embodiment will be described with reference to FIGS. 4 to 7. In the following description about the touch window of the second embodiment, the parts similar or identical to those of the first embodiment previously described will be omitted, and the same reference numbers will be assigned to the same elements.

Referring to FIGS. 4 to 7, the touch window according to the second embodiment may further include a second dummy electrode pattern 420. The second dummy electrode pattern 420 may be disposed between the sensing electrode patterns. In detail, at least one of the second dummy electrode patterns 420 may be disposed between the plurality of sensing electrode patterns.

For example, the second dummy electrode pattern is disposed between the first and second sensing electrode patterns 201 and 202, and the second and third sensing electrode patterns 202 and 203, and the third and fourth sensing electrode patterns 203 and 204.

Figure 5:
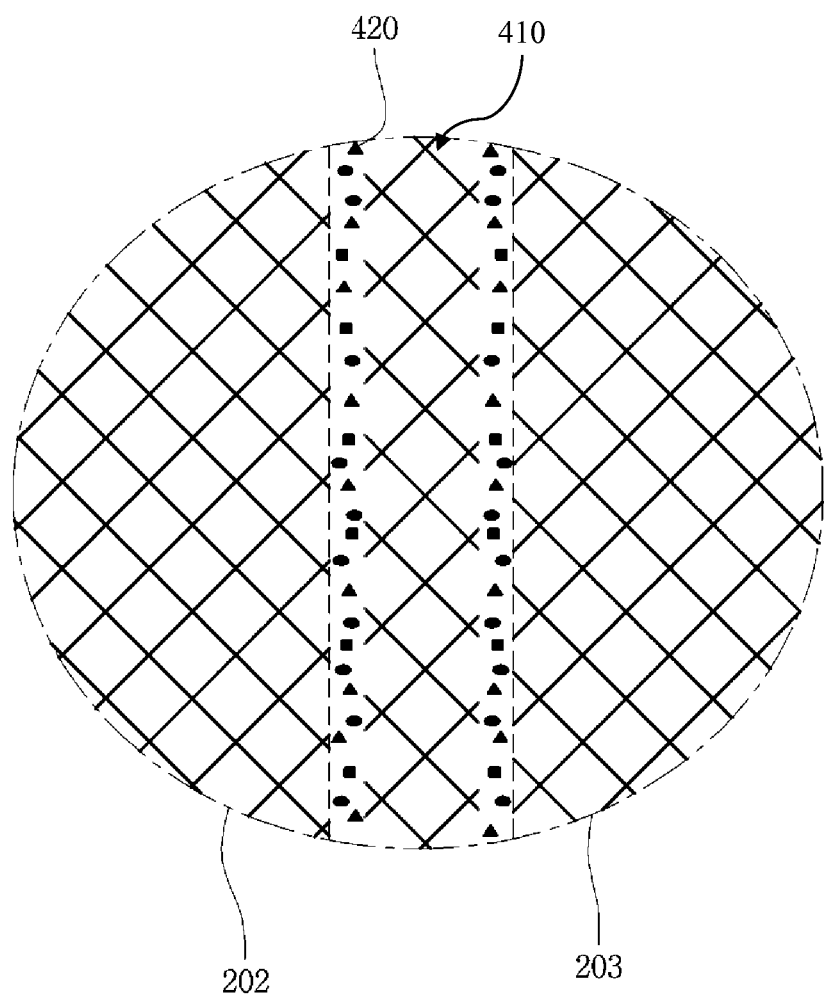
FIGS. 5 to 7 are enlarged views of area C of FIG. 4.

FIG. 5 illustrates in detail the touch window according to an embodiment may further include the second dummy electrode pattern 420. The second dummy electrode pattern 420 is disposed between the sensing electrode patterns 200. At least one of the first and second dummy electrode patterns 410 and 420 may be disposed between the sensing electrode patterns 200.

The second dummy electrode pattern 420 may be disposed between the sensing electrode pattern 200 and the first dummy electrode pattern 410. The second dummy electrode pattern 420 may be disposed between the second sensing electrode pattern 202 and the first dummy electrode pattern 410. The second dummy electrode pattern 420 may be disposed between the second sensing electrode pattern 202, in which the mesh lines are spaced apart from each other and cut off, and the first dummy electrode pattern 410.

The second dummy electrode pattern 420 may be disposed in or adjacently to an area in which the mesh lines of the second sensing electrode pattern 202 and the first dummy electrode pattern 410 are cut off. For example, at least one second dummy electrode pattern 420 may be disposed in an area in which the mesh lines of the second sensing electrode pattern 202 and the first dummy electrode pattern 410 are cut off.

The plurality of second dummy electrode patterns 420 may be randomly disposed on an area between the second sensing electrode pattern 202 and the first dummy electrode pattern 410. For example, when the extension direction of the sensing electrode pattern 200 is defined as an Y-axis direction, the second dummy electrode patterns 420 may be randomly disposed in an X-axis direction with a deviation in the range of about −40 μm to about 40 μm. When the central X-axis in the area between the second sensing electrode pattern 202 and the first dummy electrode pattern 410 is assumed as a zero point, the second dummy electrode pattern 420 may be spaced apart from the zero point by 40 y toward the second sensing electrode pattern 202 and may be spaced apart from the zero point by 40 pa toward the first dummy electrode pattern 410.

In this case, the second dummy electrode patterns 420 may also be randomly disposed in the Y-axis direction corresponding to the arrangement of the second dummy electrode pattern 420 in the X-axis direction. As described above, since the second dummy electrode patterns 420 are randomly disposed in the above-described range, the second sensing electrode pattern 202 and the first dummy electrode pattern 410 are prevented from being short circuited with each other. Similar to the sensing electrode pattern 200, the second dummy pattern 420 is allowed to have the linearity of the above-describe range, so that the second dummy pattern 420 may be prevented from being viewed from an outside.

The second dummy electrode pattern 420 may be formed in various shapes. For example, the second dummy electrode pattern 420 may be formed in a polygonal pattern such as a triangular shape or a rectangular shape, or a line shape such as a straight line or a curved line. The second dummy electrode pattern 420 may be formed in a random shape. That is, the second dummy electrode patterns 420 may have mutually different shapes. The visibility of the touch window may be more improved through the second dummy electrode pattern 420 having a random shape. The second dummy electrode pattern 420 may include a conductive material. For example, the second dummy pattern 420 may include a material equal or similar to that of the sensing electrode pattern 200 described above.

Figure 6:
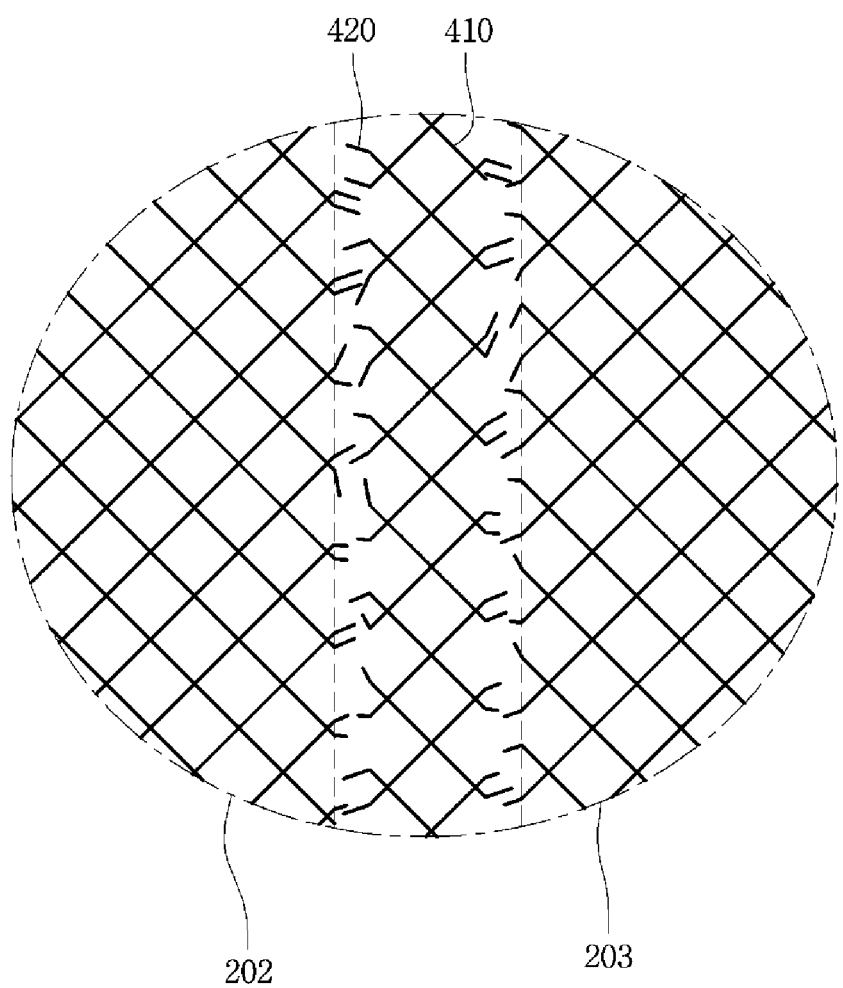

Referring to FIG. 6, the second dummy electrode pattern 420 may be connected to the mesh lines of the second sensing electrode pattern 202 and the first dummy electrode pattern 410 in the area in which the mesh lines of the second sensing electrode pattern 202 and the first dummy electrode pattern 410 are cut off.

In this case, the second dummy electrode pattern 420 connected to the second sensing electrode pattern 202 may be spaced apart from the second dummy electrode pattern 420 connected to the first dummy electrode pattern 410. The second dummy electrode pattern 420 may be connected to one of the sensing electrode pattern and the first dummy electrode pattern 410. For example, the second sensing electrode pattern 202 may include a mesh line, and the second dummy electrode pattern 420 connected to the mesh line of the second sensing electrode pattern 202 may have an extension direction different from that of the mesh line of the sensing electrode pattern.

Figure 7:
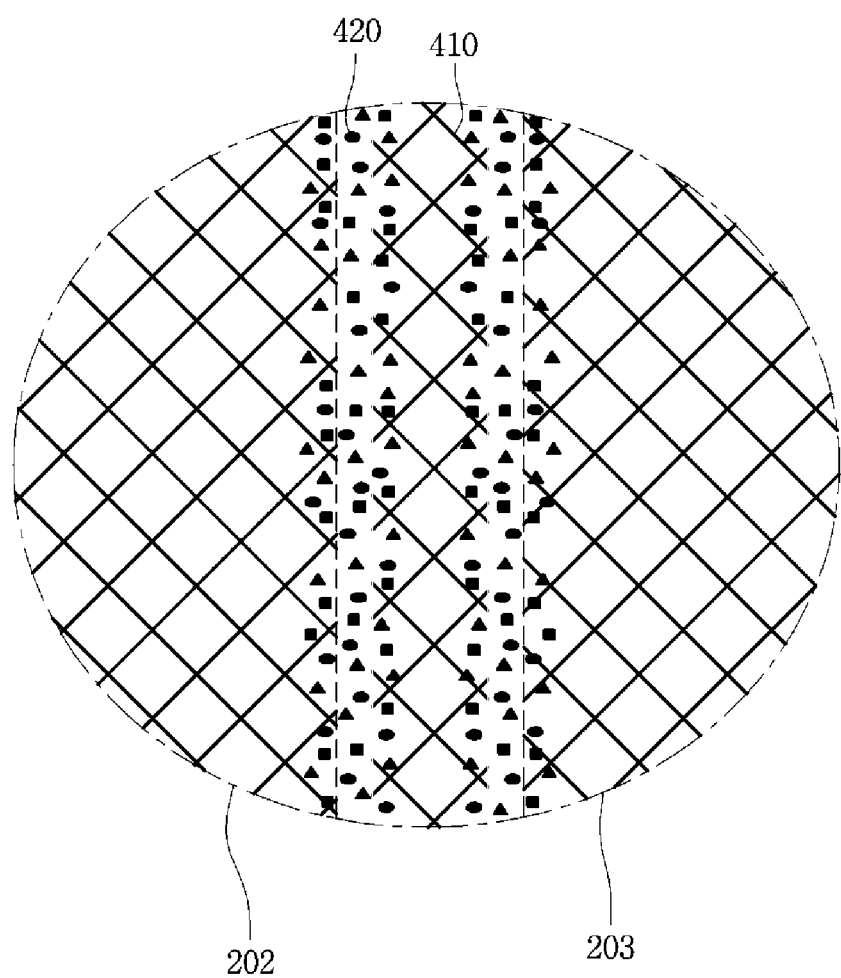

The first dummy electrode pattern 410 may include a mesh line, and the second dummy electrode pattern 420 connected to the mesh line of the first dummy electrode pattern 410 may have an extension direction different from that of the mesh line of the first dummy electrode pattern 410. The second dummy electrode patterns 420 may have mutually different extension directions. That is, the second dummy electrode pattern 420 may extend in a random direction. Referring to FIG. 7, the second dummy electrode pattern 420 may be disposed on an area in which a mesh line of the second electrode pattern 202 and the first dummy electrode pattern 410 is cut off, an area adjacent thereto and an opening part of the second sensing electrode pattern 202 and the first dummy electrode pattern 410. For example, at least one of the second dummy electrode pattern 420 may be disposed on the area in which a mesh line of the second electrode pattern 202 and the first dummy electrode pattern 410 is cut off, the area adjacent thereto and the opening part of the second sensing electrode pattern 202 and the first dummy electrode pattern 410.

According to the touch window of an embodiment, the second dummy electrode pattern 420 can prevent the sensing electrode patterns from being viewed from an outside. The second dummy pattern is disposed between the sensing electrode pattern and the first dummy electrode pattern, so that the spaced area looks as if electrodes are disposed in the spaced area, so it can be perceived that the sensing electrode pattern is viewed from an outside, so that the visibility of the touch window can be improved.

The wire electrode 300 may be connected to the sensing electrode pattern 200. In detail, one end of the wire electrode 300 is connected to the sensing electrode pattern 200 and the opposite end is connected to a printed circuit board, so that the touch signal sensed from the sensing electrode may transfer to a driving chip mounted on the printed circuit board. The wire electrode 300 may include a material equal or similar to that of the sensing electrode 210. The wire electrode 300 may include a mesh shape. A process of forming an electrode of a touch screen according to an embodiment will be described with reference to FIGS. 8 to 10.

Figure 8:
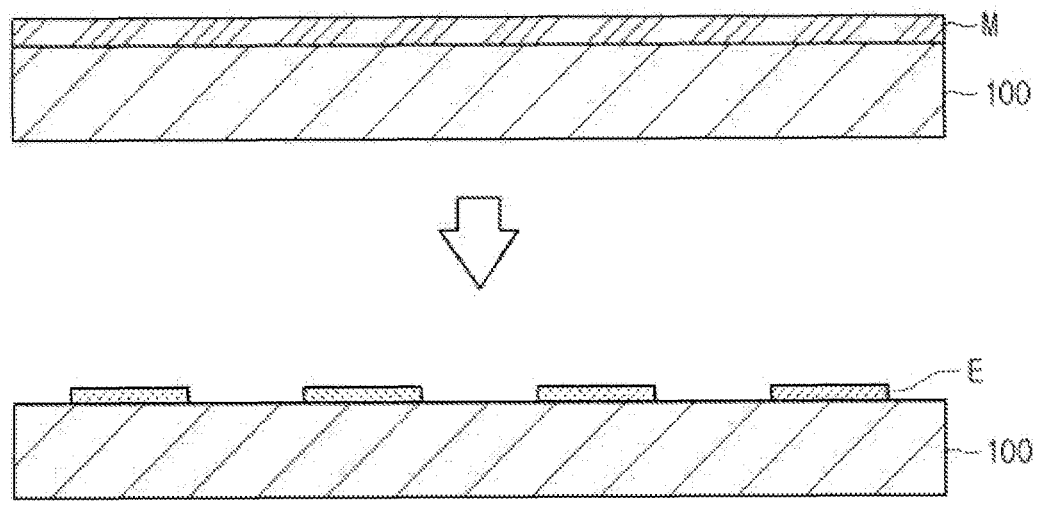
FIGS. 8 to 10 are views illustrating a process of forming an electrode of a touch window according to an embodiment.

Referring to FIG. 8, a metal layer M may be disposed on the substrate 100. The mesh layer M may be etched in a mesh shape, so that an electrode layer E including sensing and wire electrodes having a mesh shape may be formed on the substrate 100.

Figure 9:
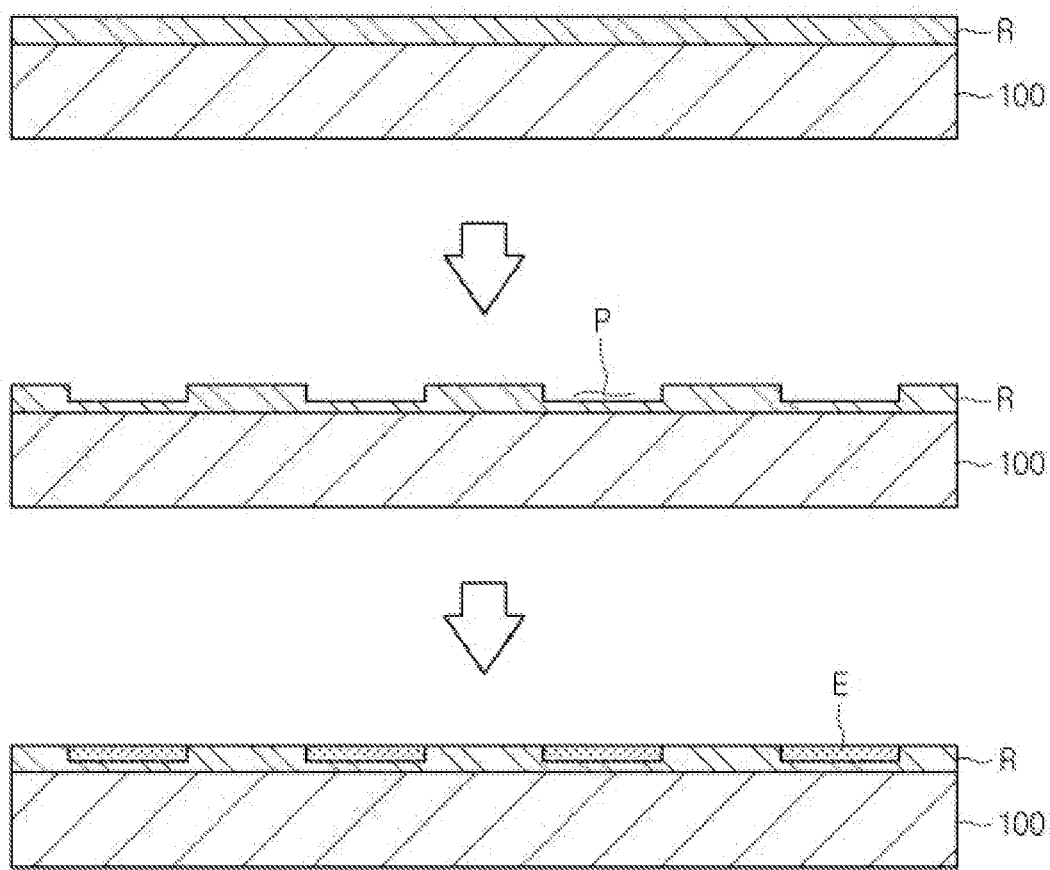

Referring to FIG. 9, after a resin layer R is disposed on the substrate 100, the resin layer R is imprinted with a concave or convex mold having a mesh shape, so that a mesh-shaped pattern P may be formed. The pattern P is filled with conductive paste such as metallic paste, so that the electrode layer E including the sensing or wire electrode having a mesh shape may be formed.

Figure 10:
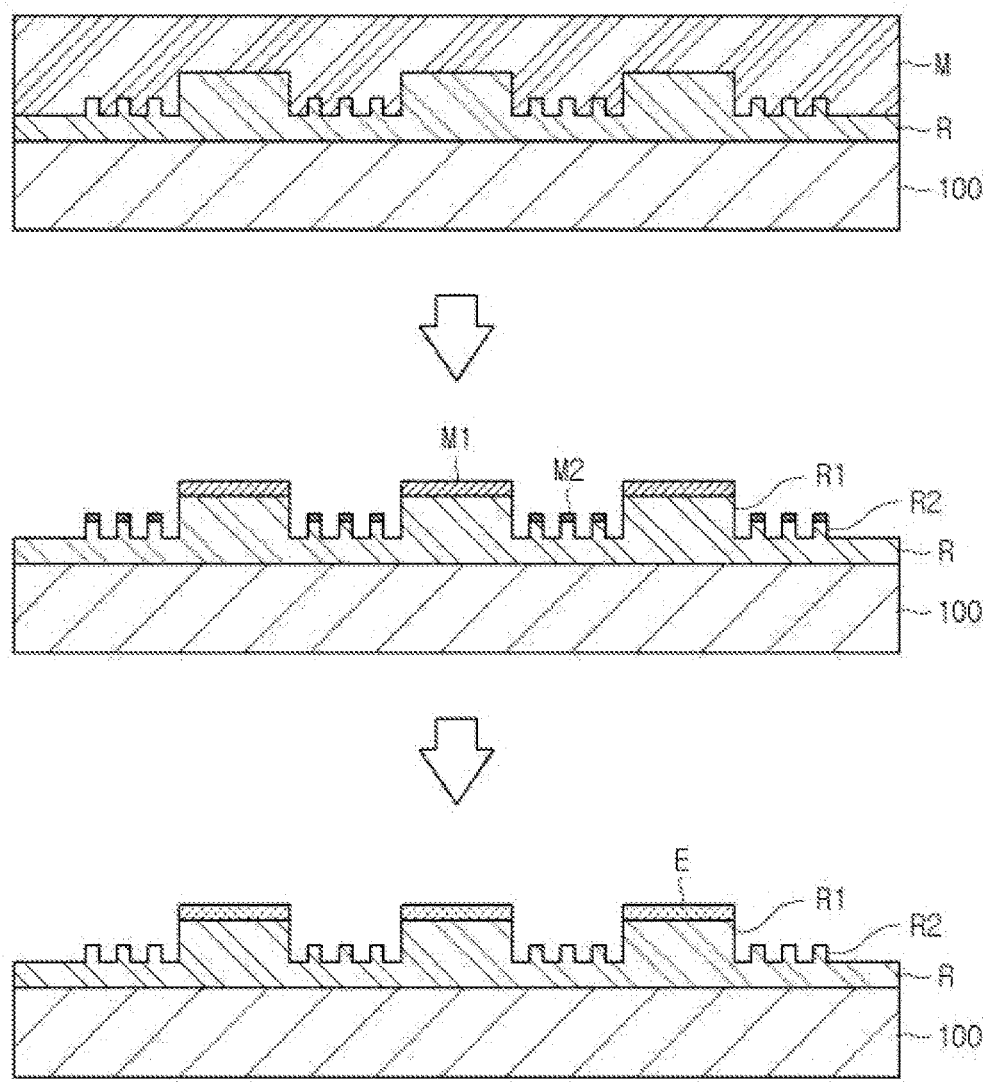

Referring to FIG. 10, after a resin layer R is disposed on the substrate 100, the resin layer R is imprinted with a concave or convex mold having a mesh shape, so that a mesh-shaped pattern P may be formed. First and second patterns R1 and R2 having mutually different sizes may be formed on the resin layer R.

A width of the first pattern R1 may be represented in a unit of micrometer (μm) and a width of the second pattern R2 may be represented in a unit of nanometer (nm).

After first and second metal layers M1 and M2 are formed on the first and second patterns R1 and R2 by sputtering a conductive material such as a metallic material, only the second metal layer M2 on the second pattern R2 is removed and the first metal layer M1 on the first pattern R1 remains, so that the electrode layer E including the sensing or wire electrode having a mesh shape may be formed.

When the metal layer is etched, a difference between the etching rates may occur due to a difference between the junction areas of the first and second patterns R1 and R2 and the first and second metal layers M1 and M2. Since the junction area of the first pattern and the first metal layer is larger than the junction area of the second pattern and the second metal layer, the electrode material on the first pattern is less etched, so that the metal layer on the first pattern remains and the metal layer on the second pattern is removed by the same etching rate. The metal electrode having a convex mesh shape corresponding to the first pattern may be formed on the substrate 100.

Figure 11:
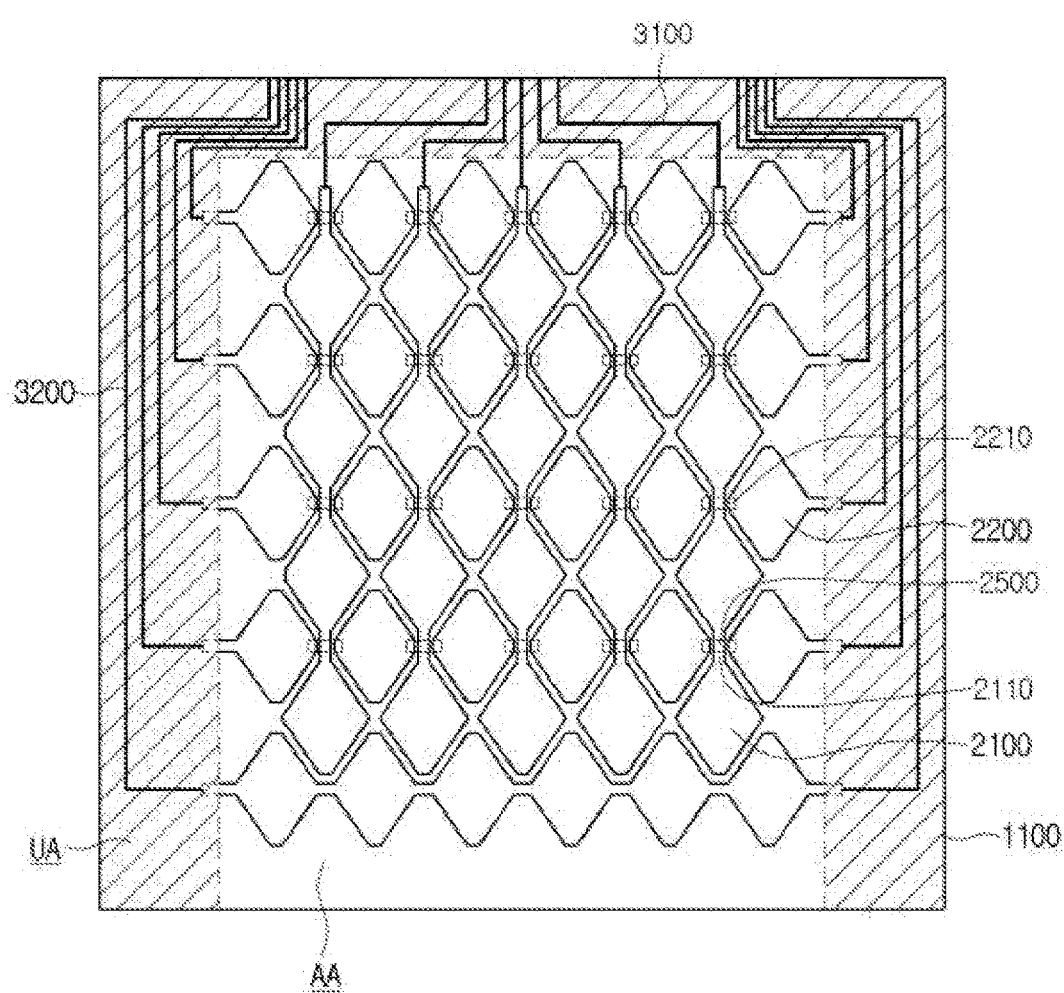
FIGS. 11 to 14 are views showing various types of touch windows according to embodiments.

FIGS. 11 to 14 are views showing various types of touch windows according to an embodiment. Referring to FIG. 11, a touch window 10 according to an embodiment may include a first substrate 1100, and first and second sensing electrodes 2100 and 2200 on the first substrate 1100. The first sensing electrode 2100 may extend in a first direction on the active area AA of the first substrate 1100. In detail, the first sensing electrode 2100 may be disposed on one surface of the first substrate 1100.

The second sensing electrode 2200 may extend in a second direction on the active area AA of the first substrate 1100. The second sensing electrode 2200 may be disposed on one surface of the first substrate 1100 while extending in the second direction different from the first direction. The first and second sensing electrodes 2100 and 2200 may extend in mutually different directions on the same surface of the first substrate 1100.

The first and second sensing electrodes 2100 and 2200 may be disposed on the same surface of the first substrate 1100 to be insulated from each other. In detail, the first sensing electrodes 2100 may be connected to each other through a first connecting electrode 2110 on which an insulating layer 2500 is disposed, and the second sensing electrode may be connected to each other through a second connecting electrode 2210 which is disposed on the insulating layer 2500. The first and second sensing electrodes 2100 and 2200 may be disposed on the same surface of the first substrate 1100, that is, one surface in the active area AA to be insulated from each other without making contact with each other.

The first substrate 1100 may be a cover substrate. The first and second sensing electrodes 2100 and 2200 may be disposed on the same surface of the cover substrate. In addition, a cover substrate may be further disposed on the first substrate 1100.

The first and second sensing electrodes 2100 and 2200 may be connected to the first and second wire electrodes 3100 and 3200 disposed on the unactive area UA. At least one of the first and second sensing electrodes 2100 and 2200 and the first and second wire electrodes 3100 and 3200 may be formed in a mesh shape including mesh lines, and the reinforcement or dummy lines described above may be disposed between the mesh lines.

Figure 12:
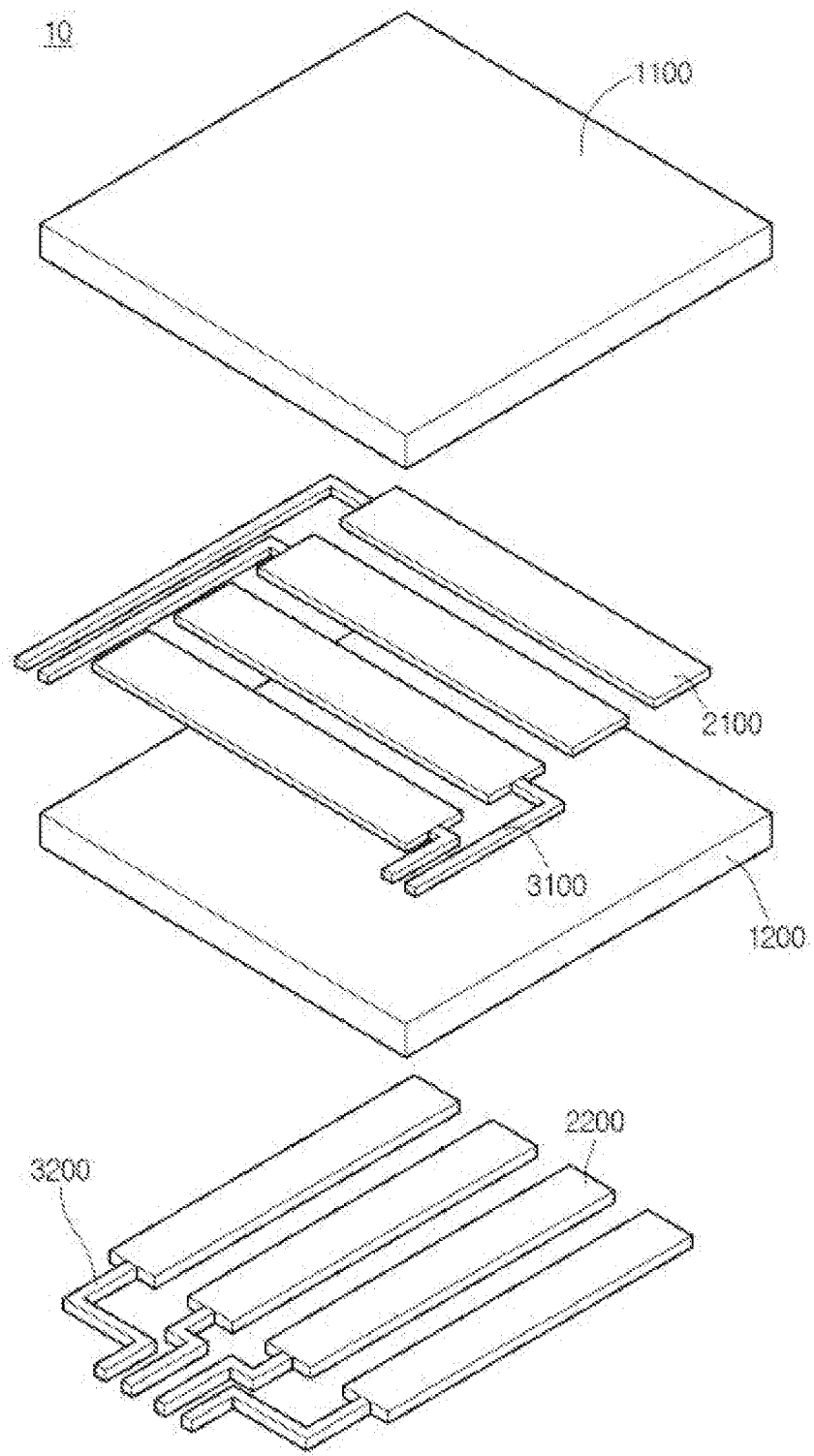

Referring to FIG. 12, the touch window 10 according to an embodiment may include the first and second substrates 1100 and 1200, the first sensing electrode on the first substrate 1100, and the second sensing electrode on the second substrate 1200. The first sensing electrode 2100 extending in one direction and the first wire electrode 3100 connected to the first sensing electrode 2100 may be disposed on one surface of the first substrate 1100, and the second sensing electrode 2200 extending in another direction different from the one direction and the second wire electrode 3200 connected to the second sensing electrode 2200 may be disposed on one surface of the second substrate 1200. At least one of the first and second sensing electrodes 2100 and 2200 and the first and second wire electrodes 3100 and 3200 may be formed in a mesh shape including mesh lines, and the reinforcement or dummy lines described above may be disposed between the mesh lines.

Figure 13:
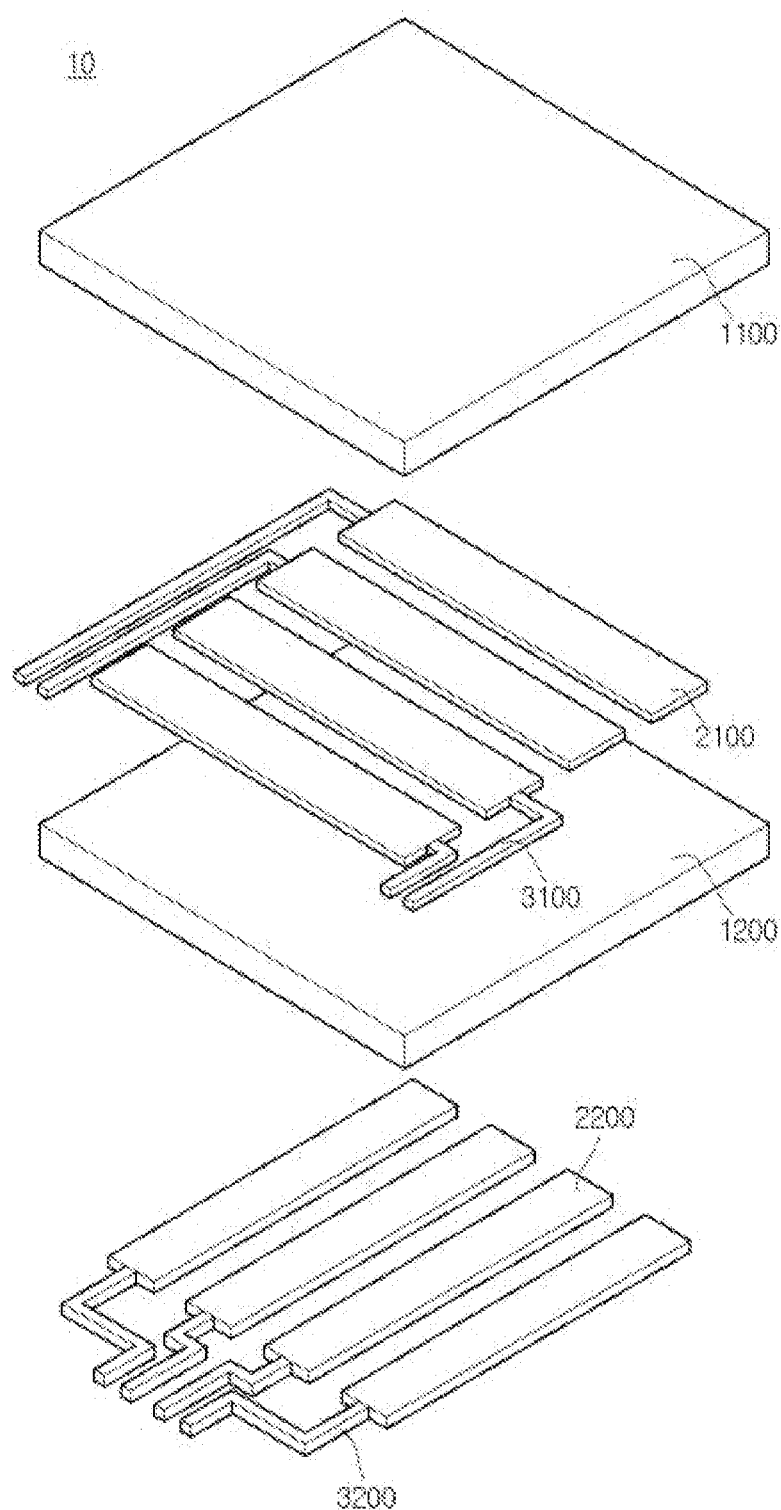

Referring to FIG. 13, the touch window 20 according to an embodiment may include the first and second substrates 1100 and 1200, and the first and second sensing electrodes on the second substrate 1200.

The first sensing electrode 2100 extending in one direction and the first wire electrode 3100 connected to the first sensing electrode 2100 may be disposed on one surface of the second substrate 1200, and the second sensing electrode 2200 extending in another direction different from the one direction and the second wire electrode 3200 connected to the second sensing electrode 2200 may be disposed on an opposite surface of the second substrate 1200.

At least one of the first and second sensing electrodes 2100 and 2200 and the first and second wire electrodes 3100 and 3200 may be formed in a mesh shape including mesh lines, and the reinforcement or dummy lines described above may be disposed between the mesh lines.

Figure 14:
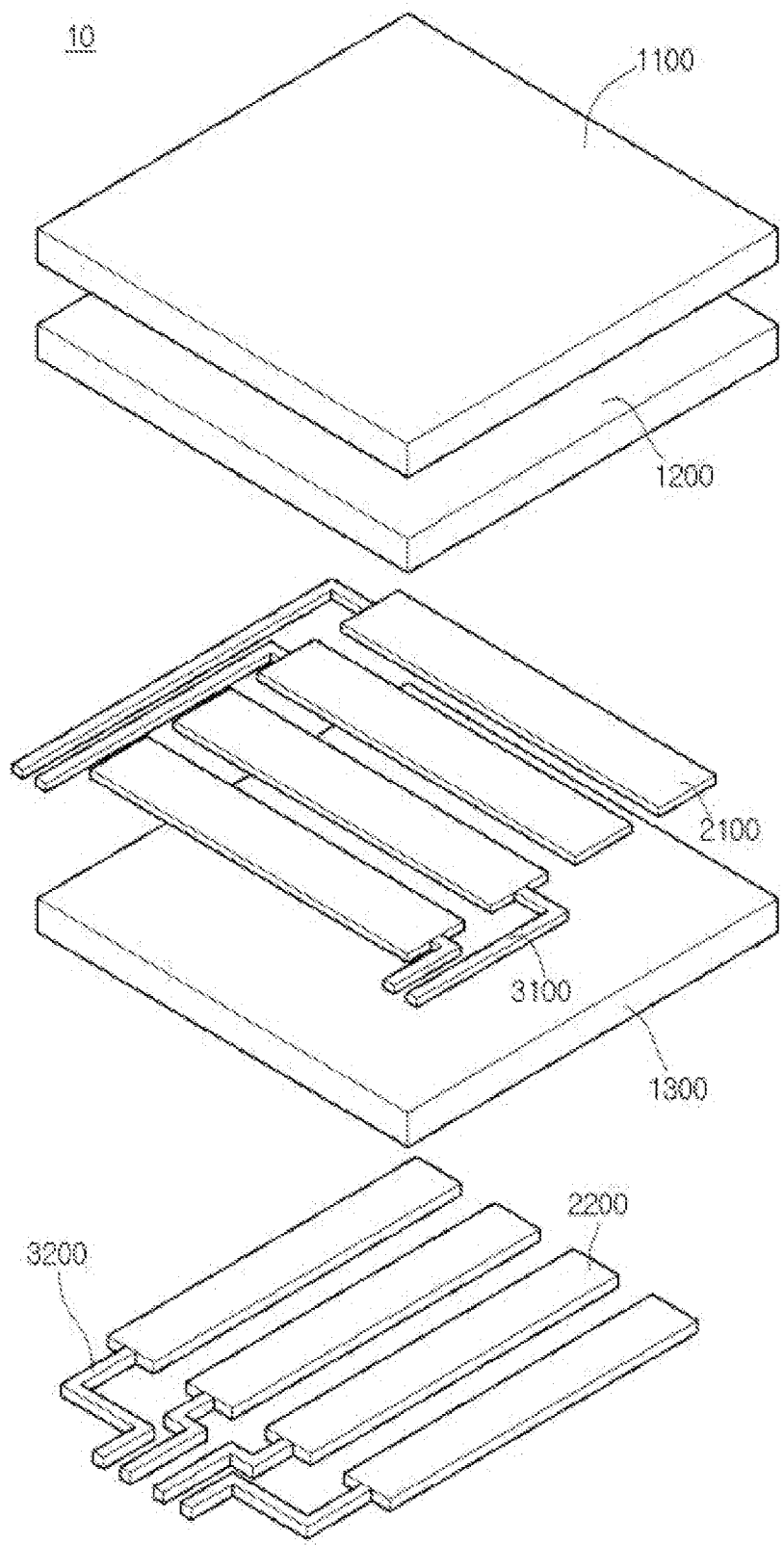

Referring to FIG. 14, the touch window 20 according to an embodiment may include the first to third substrates 1100 to 1300, the first sensing electrode on the second substrate 1200, and the second sensing electrode on the third substrate 1300. The first sensing electrode 2100 extending in one direction and the first wire electrode 3100 connected to the first sensing electrode 2100 may be disposed on one surface of the second substrate 1200, and the second sensing electrode 2200 extending in another direction different from the one direction and the second wire electrode 3200 connected to the second sensing electrode 2200 may be disposed on one surface of the third substrate 1300.

At least one of the first and second sensing electrodes 2100 and 2200 and the first and second wire electrodes 3100 and 3200 may be formed in a mesh shape including mesh lines, and the reinforcement or dummy lines described above may be disposed between the mesh lines.

The touch window described above may be coupled to a display panel and may be applied to touch device. For example, the touch window may be combined with the display panel through the adhesive layer. As shown in FIGS. 15 to 20, at least one touch electrode may be disposed on the substrate of the display panel.

Figure 15:
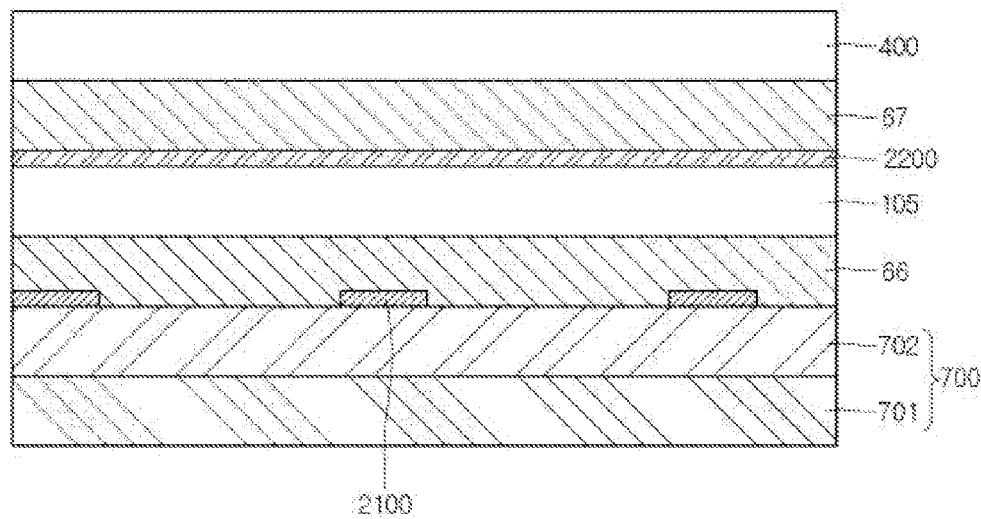
FIGS. 15 to 20 are views illustrating a touch device having an on-cell or in-cell structure, to which a touch window according to an embodiment is applied.
Figure 16:
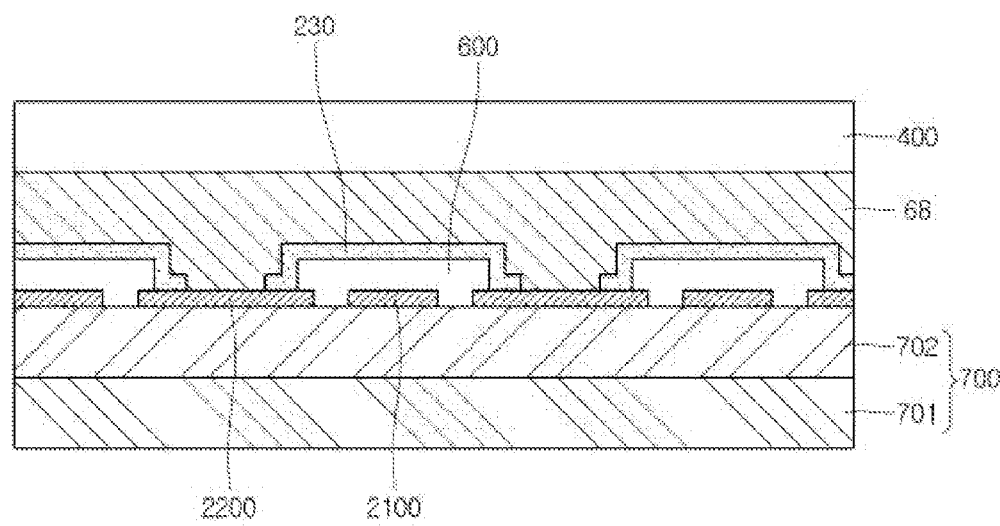

Referring to FIGS. 15 and 16, a touch device according to an embodiment may include a touch window integrated with a display panel 700. That is, a substrate for supporting at least one sensing electrode may be omitted. At least one sensing electrode may be formed on at least one of the display panel 700. The display panel 700 includes first and second substrates 701 and 702. That is, at least one sensing electrode may be formed on at least one of the first or second substrate 701 or 702.

When the display panel 700 is a liquid crystal display panel, the display panel 700 may be formed in a structure in which the first substrate 701 including thin film transistors and pixel electrodes and the second substrate 702 including color filter layers are combined with each other while interposing a liquid crystal layer therebetween.

The display panel 700 may be a liquid crystal display panel having a COT (color filter on transistor) structure in which the second substrate 702 is combined with the first substrate 701 on which a thin film transistor, a color filter and a black matrix are formed while a liquid crystal layer is interposed between the first and second substrates 701 and 702. The thin film transistor is formed on the first substrate 701, the protective layer is formed on the thin film transistor, and the color filter layer is formed on the protective layer. In addition, the pixel electrode making contact with the thin film transistor is formed on the first substrate 701. In order to improve an aperture rate and simplify a mask process, the black matrix may be omitted and a common electrode may be formed to serve as the black matrix.

When the display panel 700 is a liquid crystal panel, the display device may further include a backlight unit for providing light at the back of the display panel 700.

When the display panel 700 is an organic light emitting device, the display panel 700 includes a self light-emitting device which does not require any additional light source. A thin film transistor is formed on the first substrate 701 of the display panel 700, and an organic light-emitting device (OLED) making contact with the thin film transistor is formed. The OLED may include an anode, a cathode and an organic light-emitting layer formed between the anode and the cathode. The display panel 700 may further include the second substrate 702, which performs the function of an encapsulation substrate for encapsulation, on the OLED.

At least one sensing electrode may be formed on a top surface of the substrate disposed at an upper portion. Although a configuration of forming the sensing electrode on the top surface of the second substrate 702 is depicted in the drawings, if the sensing electrode is disposed on the first substrate 701, at least one sensing electrode may be formed on the top surface of the first substrate 701.

Figure 17:
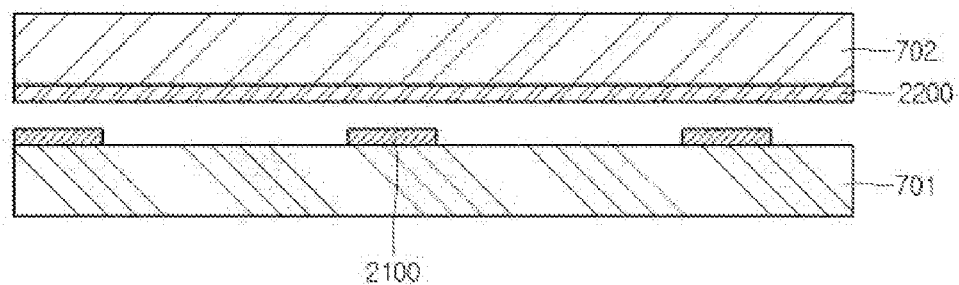

Referring to FIG. 17, the first sensing electrode 2100 may be formed on the top surface of the display panel 700. In addition, the first wire connected to the first sensing electrode 2100 may be formed. The touch substrate 105, on which the second sensing electrode 2200 and the second wire are formed, may be formed on the display panel 700 on which the first sensing electrode 2100. A first adhesive layer 66 may be formed between the touch substrate 105 and the display panel 700.

Although the second sensing electrode 2200 formed on the top surface of the touch substrate 105 and the cover substrate 400 disposed on the touch substrate while a second adhesive layer 67 is interposed between the second sensing electrode 2200 and the cover substrate 400 are depicted in the drawings, the embodiment is not limited thereto. The second sensing electrode 2200 may be formed on a rear surface of the touch substrate 105. In this case, the touch substrate 105 may serve as the cover substrate.

The embodiment is not limited to the drawings and is sufficient if the touch device has a structure in which the first sensing electrode 2100 is formed on the top surface of the display panel 700, the touch substrate 105 supporting the second sensing electrode 2200 is disposed on the display panel 700, and the touch substrate 105 is combined with the display panel 700.

The touch substrate 105 may be a polarizing plate. The second electrode 2200 may be formed on a top or rear surface of the polarizing plate. The second sensing electrode and the polarizing plate may be integrally formed.

A polarizing plate may be further provided without regard to the touch substrate 105. The polarizing plate may be disposed below the touch substrate 105. For example, the polarizing plate may be interposed between the touch substrate 105 and the display panel 700. In addition, the polarizing plate may be disposed on the touch substrate 105.

The polarizing plate may be a linear polarizing plate or an anti-reflection polarizing plate. For example, when the display panel 700 is a liquid crystal display panel, the polarizing plate may be a linear polarizing plate. In addition, when the display panel 700 is an organic electroluminescent display panel, the polarizing plate may be an anti-reflection polarizing plate.

Referring to FIG. 16, the first and second sensing electrodes 2100 and 2200 may be formed on the top surface of the display panel 700. The first wire connected to the first sensing electrode 2100 and the second wire connected to the second sensing electrode 2200 may be formed on the top surface of the display panel 700.

An insulating layer 600 exposing the second sensing electrode 2200 may be formed on the first sensing electrode 2100. A bridge electrode 250 for connecting the second sensing electrodes 2200 to each other may be further formed on the insulating layer 600.

The embodiment is not limited just to the drawings. The first sensing electrode 2100 and the first and second wires may be formed on the top surface of the display panel 700, and the insulating layer may be formed on the first sensing electrode 2100 and the first wire. The second electrode 2200 may be formed on the insulating layer, and a connecting part for connecting the second sensing electrode 2200 and the second wire to each other may be further included.

The first and second sensing electrodes 2100 and 2200 and the first and second wires may be formed on the top surface of the display panel 700 in the active area. The first and second sensing electrodes 2100 and 2200 may be spaced apart from and adjacent to each other. The insulating layer and the bridge electrode may be omitted.

The embodiment is not limited to the drawings, and it is sufficient if the first and second sensing electrodes 2100 and 2200 are formed on the display panel 700 without any additional substrates supporting the sensing electrodes.

The cover substrate 400 may be disposed on the display panel 700 while an adhesive layer 68 is interposed between the cover substrate 400 and the display panel 700. In this case, a polarizing plate may be disposed between the display panel 700 and the cover substrate 400. The touch device shown in FIGS. 15 and 16 may allow at least one substrate supporting a sensing electrode to be omitted. For this reason, a touch device having a thin thickness and a light weight may be formed.

A touch device according to still another embodiment, to which the touch windows according to the embodiments described above are applied, will be described with reference to FIGS. 17 to 20. The same description as that in the above-described embodiment will be omitted in order to avoid redundancy. The same reference numerals will be used to refer to the same elements. A touch device may include a touch window formed integrally with a display panel. That is, a substrate supporting at least one sensing electrode may be omitted. All substrates supporting sensing electrodes may be omitted.

A sensing electrode, which serves as a sensor disposed in an active area to sense a touch, and a wire, to which an electrical signal is applied, may be formed inside the display panel. At least one sensing electrode or at least one wire may be formed inside the display panel.

The display panel includes first and second substrates 701 and 702. At least one of the first and second sensing electrodes 211 and 212 is disposed between the first and second substrates 701 and 702. At least one sensing electrode may be formed on at least one surface of the first or second substrate 701 or 702.

Figure 18:
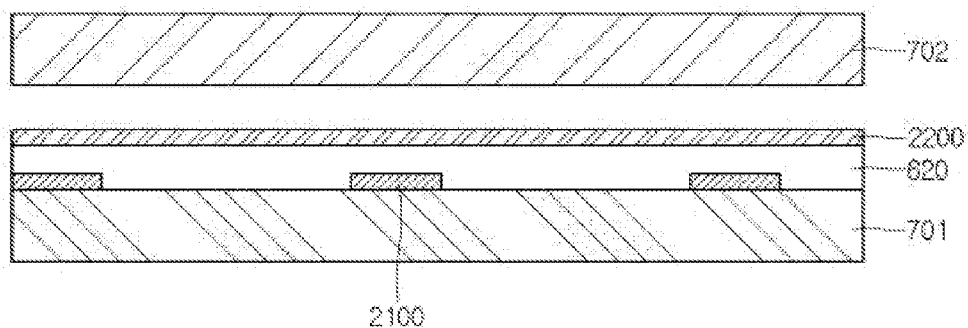
Figure 19:
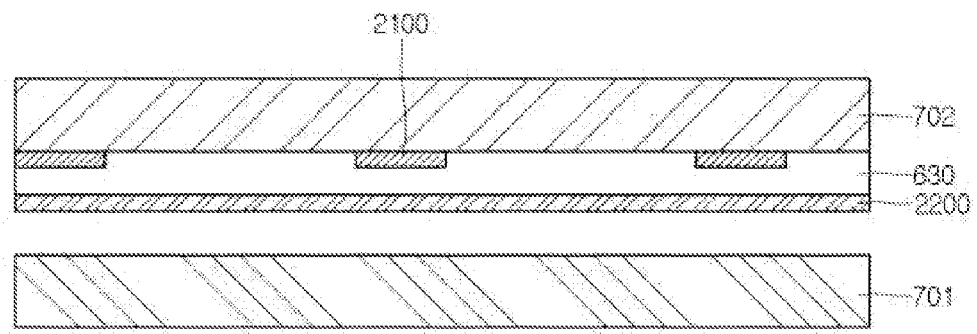
Figure 20:
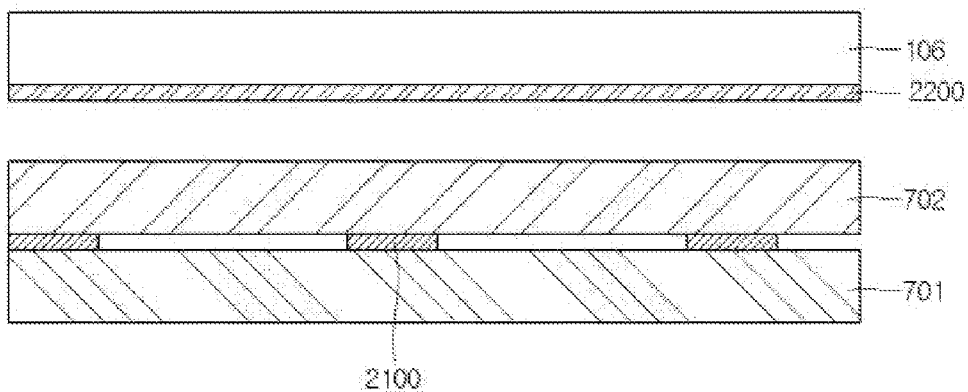

Referring to FIGS. 17 to 19, the first and second sensing electrodes 2100 and 2200 and the first and second wires may be disposed between the first and second substrates 701 and 702. The first and second sensing electrodes 2100 and 2200 and the first and second wires may be disposed inside the display panel.

Referring to FIG. 17, the first sensing electrode 2100 and the first wire may be formed on the top surface of the first substrate 701 of the display panel, and the second sensing electrode 2200 and the second wire may be formed on the rear surface of the second substrate 702. Referring to FIG. 18, the first and second sensing electrodes 2100 and 2200 and the first and second wires may be formed on the top surface of the first substrate 701. An insulating layer 620 may be formed between the first and second sensing electrodes 2100 and 2200. In addition, referring to FIG. 19, the first and second sensing electrodes 2100 and 2200 may be formed on the rear surface of the second substrate 702. An insulating layer 630 may be formed between the first and second sensing electrodes 2100 and 2200.

Referring to FIG. 18, the first sensing electrode 2100 and the first wire may be formed between the first and second substrates 701 and 702. In addition, the second sensing electrode 2200 and the second wire may be formed on the touch substrate 106. The touch substrate 106 may be disposed on the display panel including the first and second substrates 701 and 702. The first sensing electrode 2100 and the first wire may be disposed inside the display panel, and the second sensing electrode 2200 and the second wire may be disposed outside the display panel.

The first sensing electrode 2100 and the first wire may be formed on the top surface of the first substrate 701 or the rear surface of the second substrate 702. In addition, the adhesive layer may be formed between the touch substrate 106 and the display panel. In this case, the touch substrate 105 may serve as the cover substrate.

Although the configuration of forming the second sensing electrode 2200 on the rear surface of the touch substrate 106 is depicted in the drawings, but the embodiment is not limited thereto. The second sensing electrode 2200 may be formed on the top surface of the touch substrate 106, and the cover substrate may be further formed while being interposed between the touch substrate 106 and the adhesive layer.

The embodiment is not limited to the drawings, and it is sufficient if the embodiment has a structure that the first sensing electrode 2100 and the first wire are disposed inside the display panel and the second electrode 2200 and the second wire are disposed outside the display panel.

The touch substrate 106 may be a polarizing plate. That is, the second sensing electrode 2200 may be formed on the top or rear surface of the polarizing plate. The second sensing electrode may be formed integrally with the polarizing plate.

The polarizing plate may be further provided without regard to the touch substrate 106. The polarizing plate may be disposed below the touch substrate 106. For example, the polarizing plate may be interposed between the touch substrate 106 and the display panel. The polarizing plate may be disposed on the touch substrate 106.

When the display panel is a liquid crystal display panel and the sensing electrode is formed on the top surface of the first substrate 701, the sensing electrode may be formed together with a thin film transistor (TFT) and a pixel electrode. In addition, when the sensing electrode is formed on the rear surface of the second substrate 702, a color filter layer may be formed on the sensing electrode or the sensing electrode may be formed on the color filter layer. When the display panel is an organic light emitting device and the sensing electrode is formed on the top surface of the first substrate 701, the sensing electrode may be formed together with a thin film transistor or an organic light emitting device.

As shown in FIGS. 17 to 20, a touch device according to an embodiment may allow an additional substrate supporting a sensing electrode to be omitted. For this reason, a touch device having a thin thickness and a light weight may be formed. In addition, the sensing electrode and the wire are formed with a device formed on the display panel, so that the process may be simplified and the cost may be reduced.

Hereinafter, one example of a display device to which a touch window including a fingerprint sensor is applied according to the embodiment described above, will be described with reference to FIGS. 21 to 24.

Figure 21:
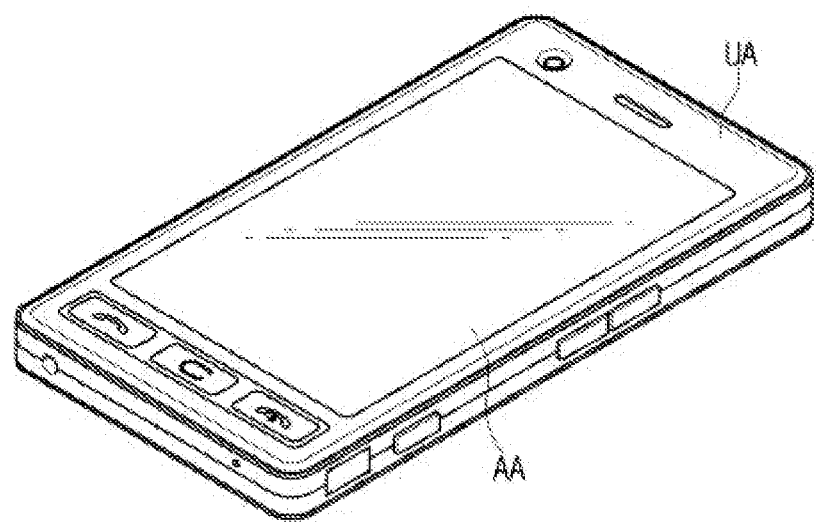
FIGS. 21 to 24 are views showing a touch device to which a touch window according to an embodiment is applied.

Referring to FIG. 21, there is shown a mobile terminal as one example of the touch device. The mobile terminal may include an active area AA and an unactive area UA. The active area AA may senses a touch signal generated when a finger touches the active area AA, and an instruction icon pattern part and a logo may be formed in the unactive area UA.

Figure 22:
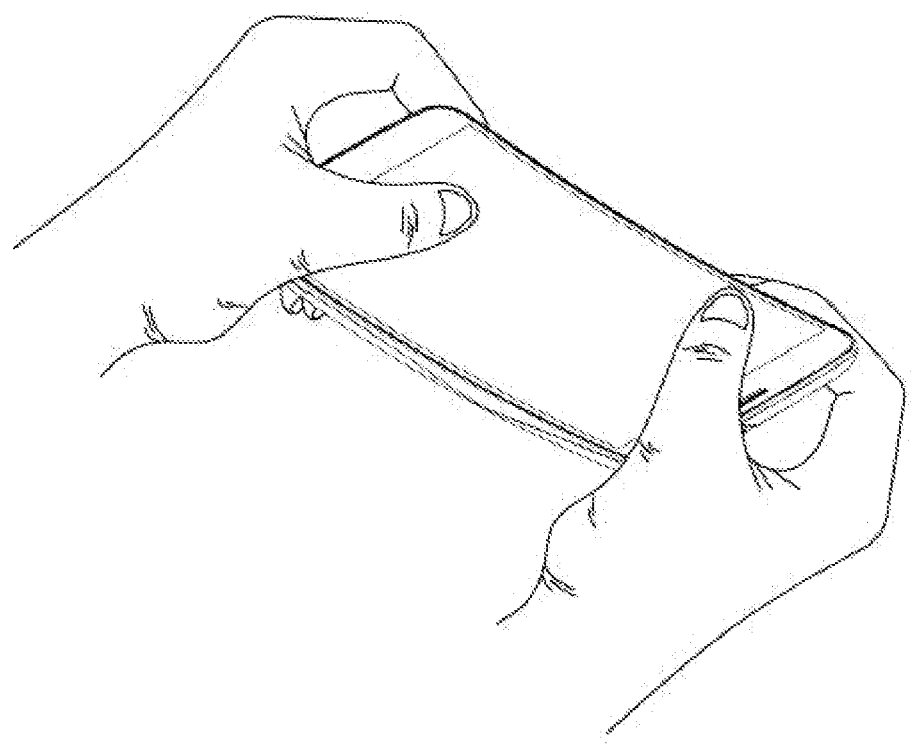

Referring to FIG. 22, the touch window may include a flexible touch window. Thus, a touch device including the flexible touch window may be a flexible touch device. Therefore, a user may bend or curve the flexible touch device with the hand of the user.

Figure 23:
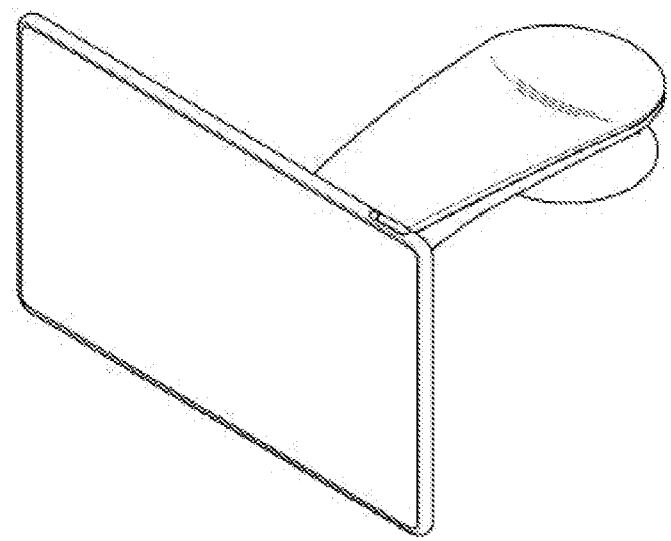

Referring to FIG. 23, the touch window may be applied to a vehicle navigation system as well as a display device such as a mobile terminal.

Figure 24:
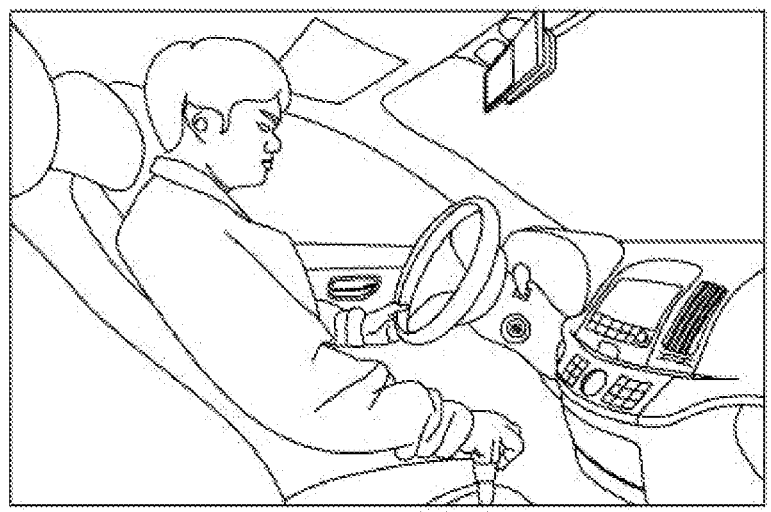

In addition, referring to FIG. 24, the touch window may be applied to a vehicle. That is, the touch window may be applied to various parts in a vehicle to which a touch window is applicable. Accordingly, the touch window is applied to a dashboard as well as a PND (Personal Navigation Display) so that a CID (Center Information Display) may be implemented. However, the embodiment is not limited to the embodiment. In other words, the display may be used in various electronic products.

In addition, although not depicted in the drawings, the touch window according to an embodiment may be applied to a wearable device such as a smart clock or smart glasses.

The embodiment is to provide a touch window having improved visibility. A touch window may include: a substrate including an active area and an unactive area; and a sensing electrode disposed on the active area and including a sensing electrode pattern having a mesh shape, wherein linearity of the sensing electrode pattern is in a range of ±40 μm to about ±100 μm.

The second dummy electrode pattern is disposed between the sensing electrode patterns, so that it is perceived as if electrodes are disposed between the sensing electrode patterns. A part in which an electrode is disposed is not visually distinguished from a part in which any electrodes are not disposed, so that the visibility can be improved.

In addition, since the sensing electrode pattern and/or the second dummy electrode pattern have linearity in the range described above, the sensing electrode pattern and/or the dummy electrode pattern can be prevented from being viewed from an outside. That is, since linearity is given to the sensing electrode pattern and/or the second dummy electrode pattern such that the sensing electrode pattern and/or the second dummy electrode pattern are connected in not a straight line bout a zigzag line, the sensing electrode pattern can be prevented from being viewed from each other, so that the visibility of the entire touch window may be improved.

It will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

In the above description, when a part is connected to the other part, the parts are not only directly connected to each other, but also indirectly connected to each other while interposing another part therebetween. In addition, when a predetermined part "includes" a predetermined component, the predetermined part does not exclude other components, but may further include other components unless otherwise indicated.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch window comprising:
 a substrate including an active area and an unactive area; and
 a sensing electrode disposed on the active area and including a sensing electrode pattern having a mesh pattern,
 wherein linearity of the sensing electrode pattern is in a range of 40 μm to 100 μm,
 wherein the linearity of the sensing electrode pattern is defined by a degree of parallel of the sensing electrode pattern,
 wherein first and second parallel lines are defined on the active area,
 when a distance of the sensing electrode pattern away from the first parallel line is defined as a first deviation, and a distance of the sensing electrode pattern away from the second parallel line is defined as a second deviation, and
 wherein a degree of the first deviation and a degree of the second deviation is defined as the linearity of the sensing electrode pattern.

2. The touch window of claim 1, wherein the sensing electrode pattern includes a first sensing electrode pattern and a second sensing electrode pattern spaced apart from each other, and the touch window further comprises a first dummy electrode pattern disposed between the first and second sensing electrode pattern.

3. The touch window of claim 2, further comprising second dummy electrode patterns disposed between the sensing electrode patterns.

4. The touch window of claim 3, wherein the second dummy electrode pattern is disposed between the sensing electrode pattern and the first dummy electrode pattern.

5. The touch window of claim 3, wherein the sensing electrode pattern and the second dummy electrode pattern are spaced apart from each other.

6. The touch window of claim 3, wherein at least one of the dummy electrode patterns includes a mesh pattern.

7. The touch window of claim 3, wherein at least one of the sensing electrode pattern or the first dummy electrode pattern includes a bar pattern.

8. The touch window of claim 3, wherein at least one of the sensing electrode and the dummy electrode includes at least one of Cr, Ni, Cu, Al, Ag, Mo or an alloy thereof.

9. The touch window of claim 1, further comprising a wire electrode pattern disposed on the unactive area and including a wire electrode, and the wire electrode includes a mesh pattern.

10. The touch window of claim 2, wherein linearity of the first dummy electrode pattern is in a range of 40 μm to 100 μm.

11. The touch window of claim 2, wherein the first dummy electrode pattern has a shape corresponding to the sensing electrode pattern.

12. The touch window of claim 3, wherein the second dummy electrode patterns have mutually different shapes.

13. The touch window of claim 3, wherein the second dummy electrode pattern is connected to one of the sensing electrode pattern and the first dummy electrode pattern.

14. The touch window of claim 13, wherein the sensing electrode pattern includes a mesh line, and the second dummy electrode pattern connected to the mesh line of the sensing electrode pattern has an extension direction different from an extension direction of the mesh line of the sensing electrode pattern.

15. The touch window of claim 13, wherein the first dummy electrode pattern includes a mesh line, and the second dummy electrode pattern connected to the mesh line of the first dummy electrode pattern has an extension direction different from an extension direction of the mesh line of the first dummy electrode pattern.

16. The touch window of claim 14, wherein the second dummy electrode patterns have mutually different extension directions.

17. The touch window of claim 13, wherein the second dummy electrode pattern is disposed on at least a partial area of the sensing electrode pattern.

18. The touch window of claim 3, wherein the second dummy electrode pattern is disposed on at least a partial area of the first dummy electrode pattern.

19. A touch window comprising:
   a substrate including an active area and an unactive area; and
   a sensing electrode disposed on the active area and including a sensing electrode pattern of meshed lines,
   wherein the sensing electrode pattern includes a first sensing electrode pattern and a second sensing electrode pattern spaced apart from each other, and
   wherein the touch window includes:
      a first dummy electrode pattern disposed between the first and second sensing electrode pattern; and
      a second dummy electrode pattern disposed between the first dummy electrode pattern and first and second sensing electrode patterns,
   wherein linearity of the sensing electrode pattern is in a range of 40 μm to 100 μm,
   wherein the linearity of the sensing electrode pattern is defined by a degree of parallel of the sensing electrode pattern,
   wherein first and second parallel lines are defined on the active area,
   when a distance of the sensing electrode pattern away from the first parallel line is defined as a first deviation, and a distance of the sensing electrode pattern away from the second parallel line is defined as a second deviation,
   wherein a degree of the first deviation and a degree of the second deviation is defined as the linearity of the sensing electrode pattern.

20. The touch window of claim 19, wherein the second dummy electrode patterns have mutually different shapes.

* * * * *